United States Patent
Kim et al.

(10) Patent No.: US 9,530,997 B2
(45) Date of Patent: Dec. 27, 2016

(54) PARTITION INCLUDING BUFFERING PAD DISPOSED ON FRAME FOR POUCH TYPE SECONDARY BATTERY

(75) Inventors: Young Ki Kim, Daejeon (KR); Won Jun Lee, Daejeon (KR); Seung Bum Kim, Suwon-si (KR)

(73) Assignee: SK INNOVATION CO., LTD. (KR)

( * ) Notice: Subject to any disclaimer, the term of this patent is extended or adjusted under 35 U.S.C. 154(b) by 163 days.

(21) Appl. No.: 14/118,630

(22) PCT Filed: May 30, 2012

(86) PCT No.: PCT/KR2012/004244
§ 371 (c)(1),
(2), (4) Date: Nov. 19, 2013

(87) PCT Pub. No.: WO2012/165846
PCT Pub. Date: Dec. 6, 2012

(65) Prior Publication Data
US 2014/0093768 A1    Apr. 3, 2014

(30) Foreign Application Priority Data
May 31, 2011    (KR) .................. 10-2011-0052025

(51) Int. Cl.
*H01M 2/10*    (2006.01)
*H01M 2/18*    (2006.01)
(Continued)

(52) U.S. Cl.
CPC ............. *H01M 2/18* (2013.01); *H01M 2/0275* (2013.01); *H01M 2/1061* (2013.01); *H01M 2/204* (2013.01); *H01M 2/347* (2013.01)

(58) Field of Classification Search
CPC ... H01M 2/0275; H01M 2/1061; H01M 2/347
(Continued)

(56) References Cited

U.S. PATENT DOCUMENTS 5,626,982 A * 5/1997 Kawai et al. ................. 429/120
2006/0115719 A1    6/2006 Jeon et al.
(Continued)

FOREIGN PATENT DOCUMENTS

CN          2733605       10/2005
JP        2006156392       6/2006
(Continued)

OTHER PUBLICATIONS

Wang et al., Machine translation of CN 2733605 Y, Oct. 2005.*
International Search Report—PCT/KR2012/004244 dated Dec. 18, 2012.

*Primary Examiner* — Sean P Cullen
(74) *Attorney, Agent, or Firm* — Cantor Colburn LLP

(57) ABSTRACT

A pouch type secondary battery includes a pouch having a receiving part receiving an electrolyte therein and a sealing part formed by sealing an outer circumference of the receiving part in order to seal the receiving part and an electrode tab connected to one side of the pouch so as to be protruded, and at least one partition provided between at least two pouch type secondary batteries. The partition comprises: an electrode tab supporting part supporting the electrode tab; a frame extended from the electrode tab supporting part, supporting the sealing part, and having the receiving part inserted thereinto; and a buffering pad attached to an inner side of the frame at which the receiving part is seated so as to be disposed between the frame and the receiving part. The buffering pad has a cross-sectional shape in which one side of a rectangular frame is opened.

2 Claims, 7 Drawing Sheets

(51) Int. Cl.
    *H01M 6/46*        (2006.01)
    *H01M 2/02*        (2006.01)
    *H01M 2/20*        (2006.01)
    *H01M 2/34*        (2006.01)

(58) Field of Classification Search
    USPC .......................................................... 429/152
    See application file for complete search history.

(56)                References Cited

U.S. PATENT DOCUMENTS

| | | |
|---|---|---|
| 2008/0118824 A1 | 5/2008 | Oguma et al. |
| 2010/0209760 A1 | 8/2010 | Yoshihara et al. |
| 2011/0200866 A1 | 8/2011 | Yun et al. |
| 2011/0318623 A1* | 12/2011 | Lee et al. ...................... 429/100 |
| 2012/0070710 A1* | 3/2012 | Kritzer ................ H01M 2/1061 |
| | | 429/100 |

FOREIGN PATENT DOCUMENTS

| | | |
|---|---|---|
| JP | 2008153203 | 7/2008 |
| JP | 2010244949 | 10/2010 |
| KR | 1020080027504 | 3/2008 |
| KR | 1020090030202 | 3/2009 |
| WO | WO 2010050697 A2 * | 5/2010 |

* cited by examiner

PARTITION INCLUDING BUFFERING PAD DISPOSED ON FRAME FOR POUCH TYPE SECONDARY BATTERY

TECHNICAL FIELD

The present invention relates to a partition of a pouch type secondary battery, and more particularly, to a partition of a pouch type secondary battery provided between at least two pouch type secondary batteries stacked in order to configure a secondary battery module to prevent damage of a surface of the pouch type secondary battery and shaking of the pouch type secondary battery at the time of vibration while preventing damage of the pouch type secondary battery due to a short-circuit.

BACKGROUND ART

Generally, research into a secondary battery capable of being charged and discharged unlike a primary battery has been actively conducted in accordance with the development of state-of-the-art fields such as a digital camera, a cellular phone, a laptop computer, a hybrid automobile, and the like. An example of the secondary battery includes a nickel-cadmium battery, a nickel-metal hydride battery, a nickel-hydrogen battery, and a lithium secondary battery. Among them, the lithium secondary battery, which has operating voltage of 3.6 V or more, is used as a power supply of a portable electronic device or a plurality of lithium secondary batteries are connected in series with each other to thereby be used for a high output hybrid automobile. Since this lithium secondary battery has operating voltage three times higher than that of the nickel-cadmium battery or the nickel-metal hydride battery is more excellent in view of energy density characteristics per unit weight than the nickel-cadmium battery or the nickel-metal hydride battery, the use of the lithium secondary battery has rapidly increased.

The lithium secondary battery may be manufactured in various types. As a typical type of the lithium secondary battery, there are a cylindrical type and a prismatic type that are mainly used for a lithium ion battery. A lithium polymer battery that has been recently spotlighted is manufactured in a pouch type having flexibility. The pouch type lithium polymer battery as described above (hereinafter, referred to as a "pouch type secondary battery") has a comparatively free shape.

Referring to FIGS. 1 and 2, a pouch type secondary battery 1 generally includes a pouch 2 receiving an electrolyte therein and an electrode tab 3 for electrical connection, wherein the pouch 2 is protected by a case 4 since it may be easily bent or curved. In order to be advantageous in view of a manufacturing cost in configuring a large capacity battery module 10 by stacking a plurality of pouch type secondary batteries 1 and electrically connecting the plurality of pouch type secondary batteries 1 to each other, at least two pouch type secondary batteries 1 are stacked in the case 4, and a partition 5 is disposed between the pouch type secondary batteries 1 so as to stably support the pouch type secondary batteries 1 and prevent a short-circuit of the electrode tab 3.

However, the partition 5 disposed between the pouch type secondary batteries 1 damages a surface of the pouch 2 of the pouch type secondary battery 1 or a gap is generated between the partition 5 and the pouch 2, such that shaking may be generated in the pouch type secondary battery 1 at the time of vibration.

DISCLOSURE OF INVENTION

Technical Problem

An object of the present invention is to provide a partition of a pouch type secondary battery provided between at least two pouch type secondary batteries stacked in order to configure a secondary battery module to prevent damage of a surface of the pouch type secondary battery and shaking of the pouch type secondary battery at the time of vibration while preventing damage of the pouch type secondary battery due to a short-circuit.

Solution to Problem

In one general aspect, at least one partition of a pouch type secondary battery provided between at least two pouch type secondary batteries each including a pouch having a receiving part receiving an electrolyte therein and a sealing part formed by sealing an outer circumference of the receiving part in order to seal the receiving part and an electrode tab connected to one side of the pouch so as to be protruded for electrical connection in order to prevent damage of the pouch type secondary battery due to a short-circuit in a secondary battery module in which at least two pouch type secondary batteries are stacked, includes: an electrode tab supporting part supporting the electrode tab; a frame extended from the electrode tab supporting part, supporting the sealing part, and having the receiving part inserted thereinto; and a buffering pad attached to an inner side of the frame so as to be disposed between the frame and the receiving part in order to prevent damage of a surface of the pouch type secondary battery.

The buffering pad may have a depression part and be attached to the frame in a form in which an inner end portion of the frame is fitted into the depression part.

The buffering pad may have a cross-sectional shape in which one side of a rectangular frame is opened.

The frame may have a thickness thinner at the inner end portion to which the buffering pad is attached than at a portion at which the buffering pad is not attached.

Advantageous Effects of Invention

The partition of the pouch type secondary battery is provided between at least two pouch type secondary batteries stacked in order to configure the secondary battery module in order to prevent a short-circuit of the pouch type secondary battery and includes the buffering pad attached to the inner side of the frame of the partition, thereby making it possible to prevent the damage of the surface of the pouch type secondary battery and reduce the gap between the pouch type secondary battery and the partition. Therefore, the pouch type secondary battery may be disposed at an accurate position, and the shaking of the pouch type secondary battery may be prevented at the time of the vibration.

BRIEF DESCRIPTION OF DRAWINGS

The above and other objects, features and advantages of the present invention will become apparent from the following description of preferred embodiments given in conjunction with the accompanying drawings, in which.

BEST MODE FOR CARRYING OUT THE INVENTION

Hereinafter, a technical spirit of the present invention will be described in more detail with reference to the accompanying drawings.

However, the accompanying drawings are only examples shown in order to describe the technical idea of the present invention in more detail. Therefore, the technical idea of the present invention is not limited to shapes of the accompanying drawings.

Figure 1:
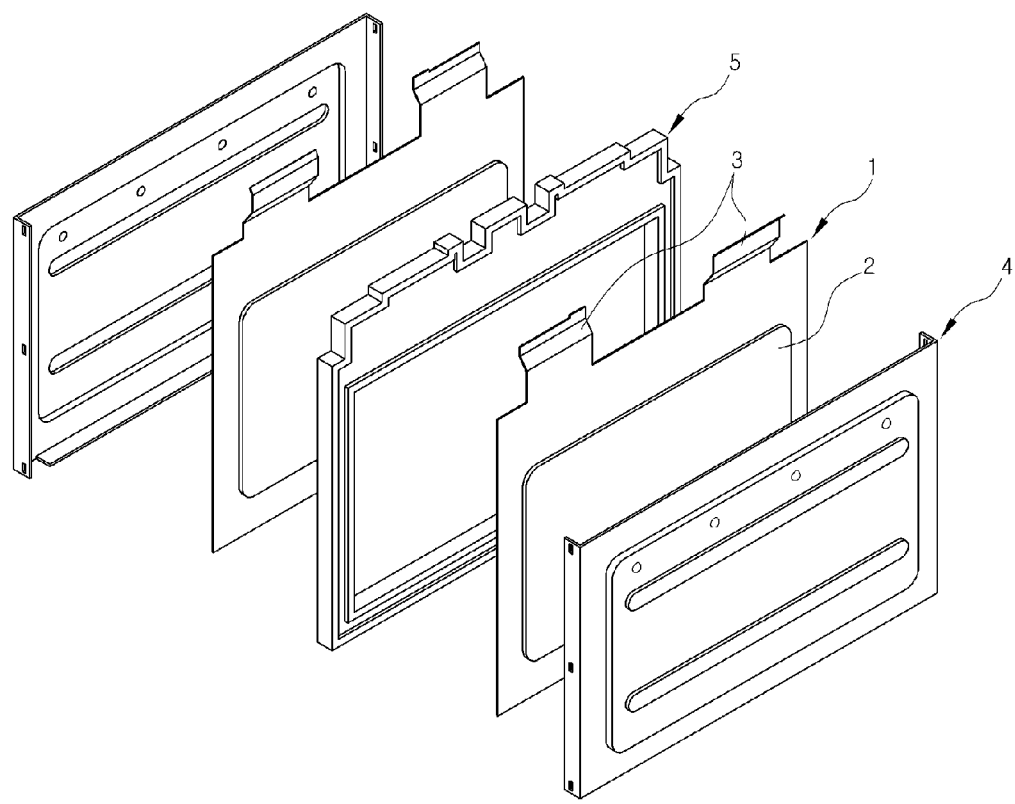
FIG. 1 is an exploded perspective view of a module configured of a general pouch type secondary battery.
Figure 2:
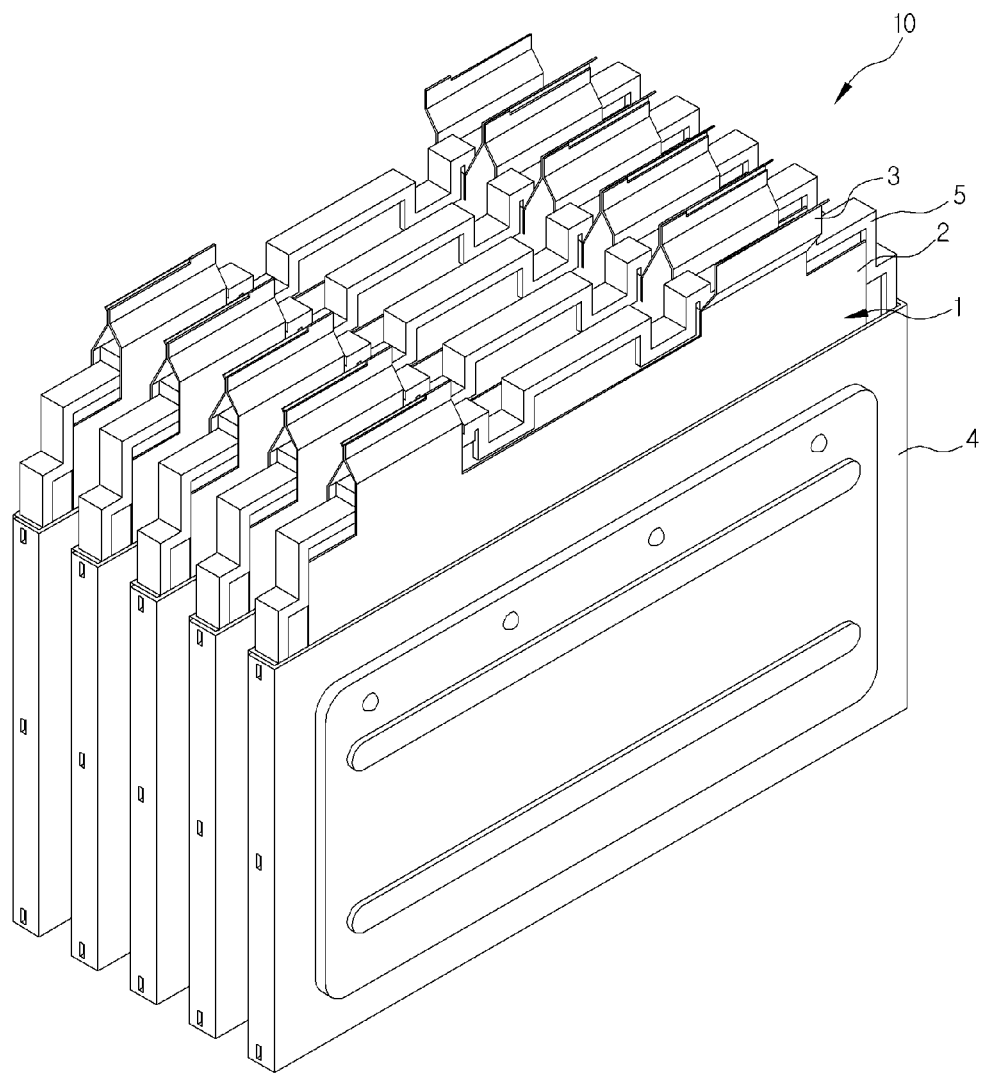
FIG. 2 is an exploded perspective view of a large capacity battery module configured of a general pouch type secondary battery.
Figure 3:
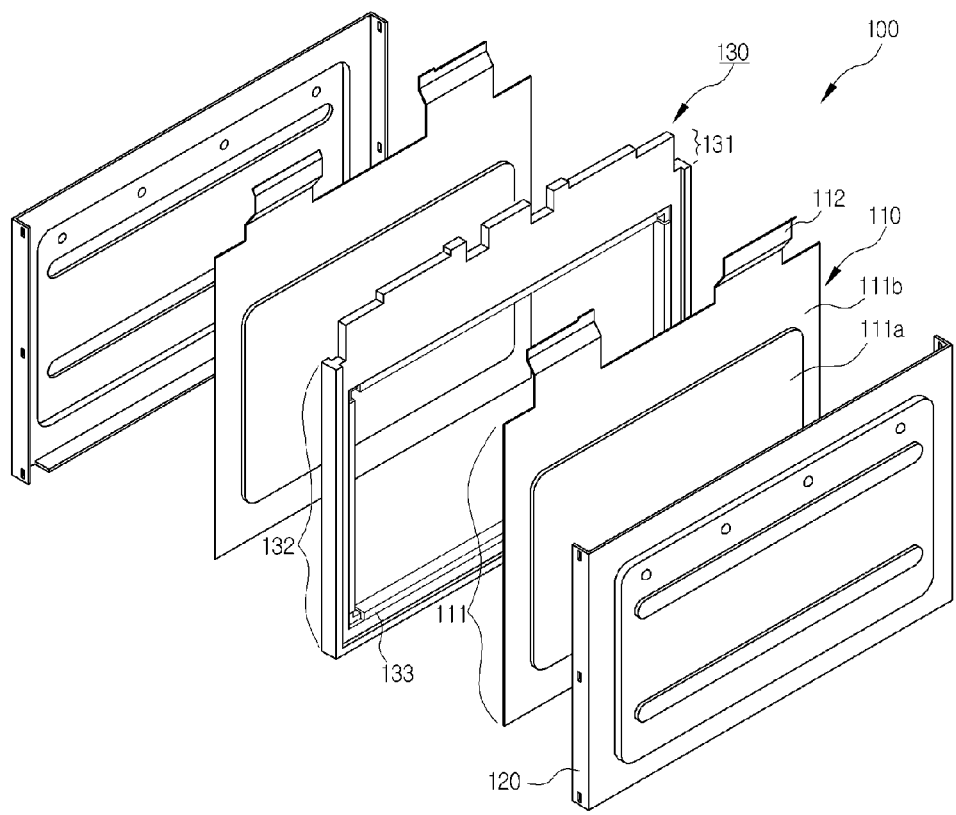
FIG. 3 is an exploded perspective view of a secondary battery module including a partition of a pouch type secondary battery according to an exemplary embodiment of the present invention.
Figure 4:
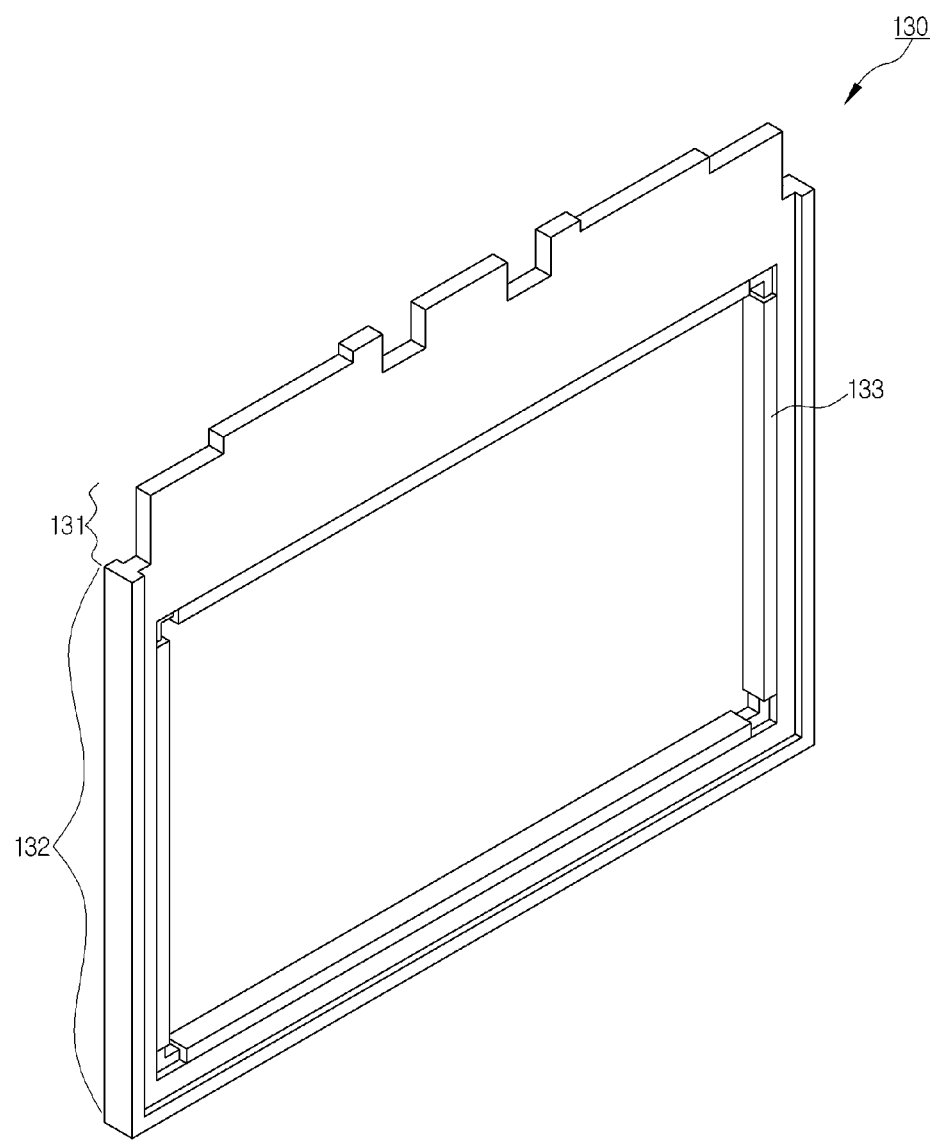
FIG. 4 is a perspective view of the partition of the pouch type secondary battery according to the exemplary embodiment of the present invention.
Figure 5:
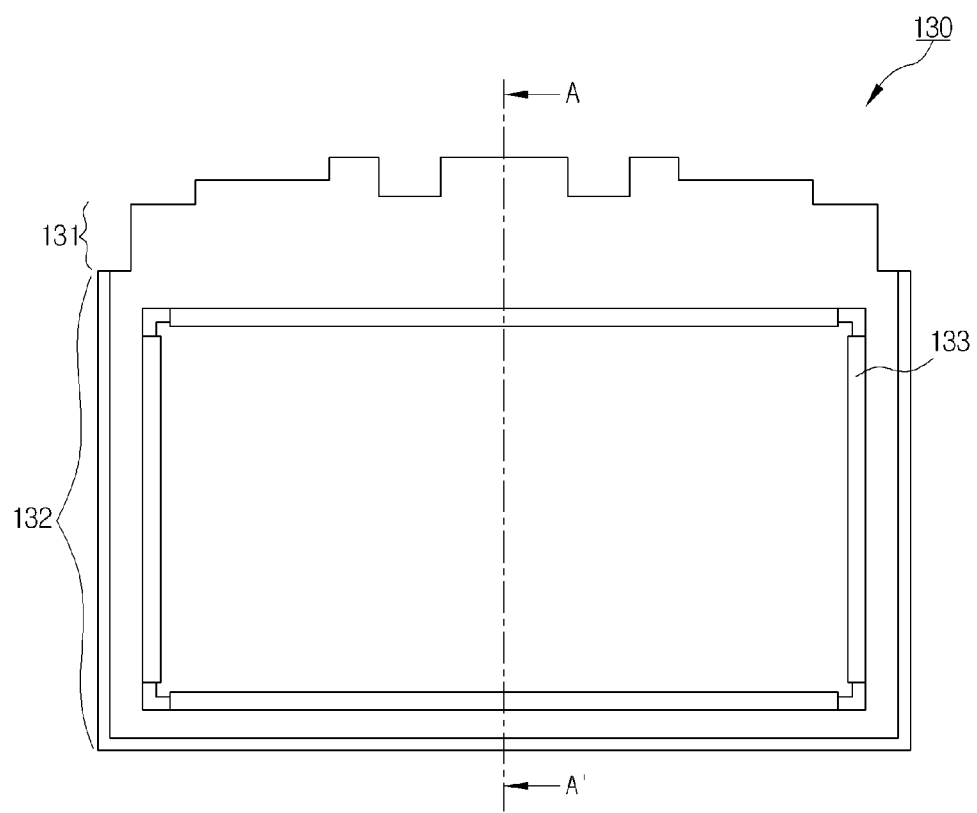
FIG. 5 is a front view of the partition of the pouch type secondary battery according to the exemplary embodiment of the present invention.
Figure 6:
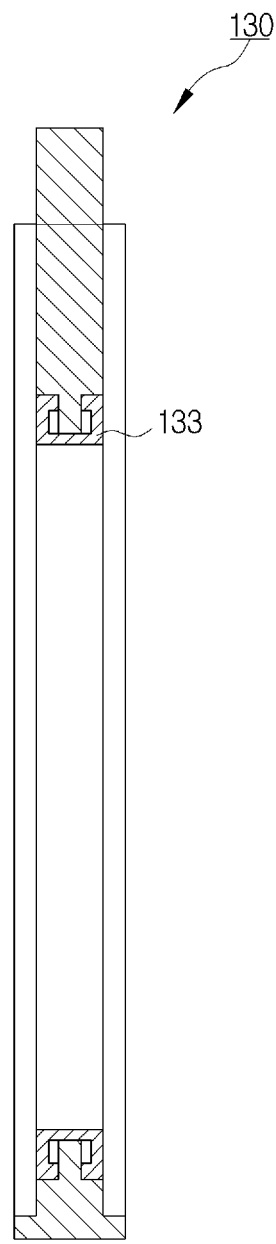
FIG. 6 is a cross-sectional view taken along the line A-A' of FIG. 5.

FIG. 3 is an exploded perspective view of a secondary battery module 100 including a partition 130 of a pouch type secondary battery according to an exemplary embodiment of the present invention; FIG. 4 is a perspective view of the partition of the pouch type secondary battery according to the exemplary embodiment of the present invention; FIG. 5 is a front view of the partition of the pouch type secondary battery according to the exemplary embodiment of the present invention; FIG. 6 is a cross-sectional view taken along the line A-A' of FIG. 5; and FIG. 7 is a cross-sectional view of the pouch type secondary batteries 110 stacked on the partition 130 of the pouch type secondary battery according to the exemplary embodiment of the present invention.

The partition 130 of the pouch type secondary battery 110 according to the exemplary embodiment of the present invention is provided between the pouch type secondary batteries 110 in the secondary battery module 100 in which at least two pouch type secondary batteries 110 are stacked, thereby making it possible to prevent damage of the pouch type secondary battery 110 due to a short-circuit, and includes a buffering pad 133 attached thereto, thereby making it possible to prevent damage of a surface of the pouch type secondary battery 110.

Referring to FIGS. 3 and 4, the pouch type secondary battery 110 includes a pouch 111 having a receiving part 111a receiving an electrolyte therein and a sealing part 111b formed by sealing an outer circumference of the receiving part 111a in order to seal the receiving part 111a; and an electrode tab 112 connected to one side of the pouch 111 so as to be protruded for electrical connection. The pouch type secondary battery 110 needs to be protected by a firm apparatus in order to be used for a long period of time since the pouch 111 may be easily bent or curved. Therefore, a case 120 enclosing an outer surface of the pouch type secondary battery 110 except for the electrode tab 112 may be provided. The secondary battery module 100 is formed using the pouch type secondary battery 110 and the case 120, at least two pouch type secondary batteries 110 are stacked, and the electrode tab 112 is electrically connected to the pouch type secondary batteries 110, thereby making it possible to configure a large capacity battery module. Here, the secondary battery module 100 may include at least two pouch type secondary batteries 110 stacked in the case 120 so as to be advantageous in view of a manufacturing cost and the partition 130 provided between the pouch type secondary batteries 110 in order to prevent damage of the pouch type secondary battery 110 due to a short-circuit.

Figure 7:
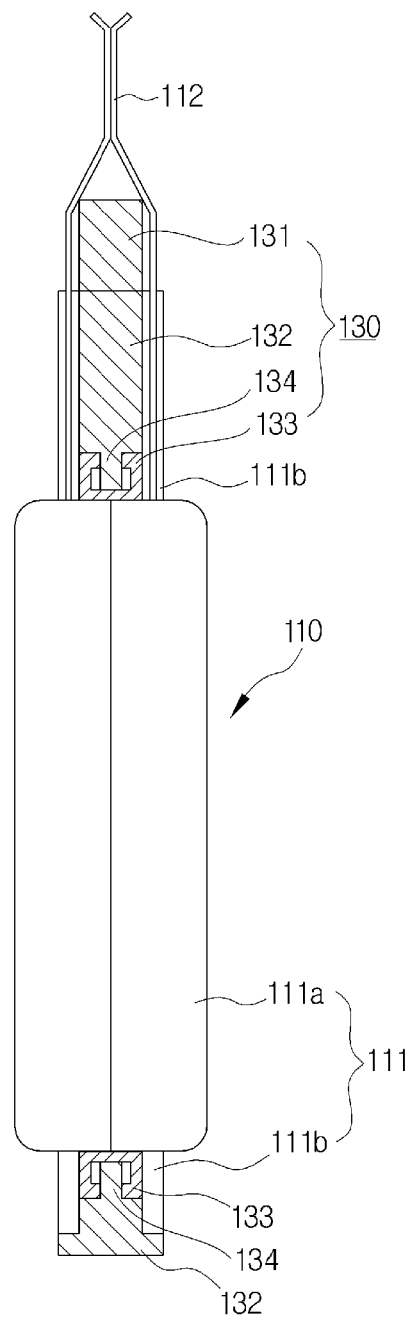
FIG. 7 is a cross-sectional view of the pouch type secondary batteries stacked on the partition of the pouch type secondary battery according to the exemplary embodiment of the present invention.

Referring to FIGS. 5 to 7, the partition 130 of the pouch type secondary battery includes an electrode tab supporting part 131 disposed between the electrode tabs 112 to support the electrode tabs 112 so that laser welding may be performed for electrical connection of the electrode tabs 112 and a frame 132 extended from the electrode tab supporting part 131, disposed between the sealing parts 111b to support the sealing parts 111b, and formed in a frame shape in which it has an empty space formed therein to have the receiving parts 111a inserted thereinto. Since the sealing part 111b is sealed by being applied with heat and pressure at both sides thereof, the sealing part 111b has a thin thickness, and since the receiving part 111a receives an electrolyte therein, the receiving part 111a has a thick thickness. Therefore, the pouch 111 including the receiving part 111a and the sealing part 111b may be stably stacked using the frame 132 as described above formed in the frame shape. Here, the buffering pad 133 for protecting a surface of the pouch type secondary battery 110 is attached to an inner side of the frame 132 so as to be disposed between the frame 132 and the receiving part 111a. In the structure as described above, the receiving part 111a is inserted into the frame 132 of the partition 130 formed firmly, such that damage of the surface of the pouch type secondary battery may be prevented, and a gap between the receiving part 111a and the frame 132 is not present, such that the pouch type secondary battery 110 may be disposed at an accurate position and shaking of the pouch type secondary battery 110 may be prevented in the case in which vibration is transferred thereto.

Referring to FIGS. 6 and 7, the buffering pad 133 may have a depression part and be attached to the frame 132 in a form in which an inner end portion 134 of the frame 132 is fitted into the depression part. According to the above-mentioned structure, the damage of the surface of the pouch type secondary battery 110 may be easily prevented and the buffering pad 133 may be firmly attached, as compared to a structure in which the buffering pad 133 is attached only to an inner peripheral surface of the frame 132.

Referring to FIGS. 6 and 7, the buffering pad 133 may have a cross-sectional shape in which one side of a rectangular frame is opened. The shape of the buffering pad 133 as described above may allow the buffering pad to be easily attached to the frame 132 and allow the pouch type secondary battery 110 to be disposed at an accurate position in the frame 132.

Referring to FIGS. 6 and 7, the frame 132 may have a thickness thinner at the inner end portion 134 to which the buffering pad 133 is attached than at a portion at which the buffering pad 133 is not attached. When a portion of the frame 132 to which the buffering pad 133 is attached at the inner end portion 134 of the frame 132 has a thickness thicker than that of a portion of the frame 132 to which the buffering pad is not attached, since a stacking surface on which the pouch type secondary batteries are stacked is not uniform, a gap between the partition 130 and the pouch type secondary battery 110 may be generated. Therefore, the partition 130 may be formed so that the inner end portion 134 of the frame 132 to which the buffering pad 133 is attached has a thickness thinner than that of a portion of the frame 132 to which the buffering pad 133 is not attached.

The partition 130 as described above may have the buffering pad 133 attached thereto by insert injection. According to the insert injection, which is a molding method of integrating heterogeneous different colored synthetic resins or components other than the synthetic resins with each other, a molding product that is difficult to be obtained only with the synthetic resin may be obtained. Therefore, the partition 130 and the buffering pad 133 having heterogeneous characteristics may be integrated with each other using the insert injection molding method.

In addition, the partition 130 may have the buffering pad 133 attached thereto by double injection. According to the double injection, which is a molding method of filling a space between a primary molding product and a secondary mold with a secondary resin using two resins or resins having two different colors, lubricity, mechanical characteristics, and the like, of each resin may be maintained. Therefore, the double injection molding method is used, thereby making it possible to attach the buffering pad 133 to the partition 130 while maintaining characteristics of each resin configuring the partition 130 and the buffering pad 133 as they are.

Further, the partition 130 may have the buffering pad 133 attached thereto by an adhesive tape. According to the above-mentioned method, the buffering pad 133 may be attached to the partition 130 without again performing an injection process on the injection molded partition 130.

The partition 130 of the pouch type secondary battery as described above is provided between at least two pouch type secondary batteries 110 stacked in order to configure the secondary battery module 100 in order to prevent a short-circuit of the pouch type secondary battery 110 and includes the buffering pad 133 attached to the inner side of the frame 132, thereby making it possible to prevent the damage of the surface of the pouch type secondary battery 110 and reduce the gap between the pouch type secondary battery 110 and the partition 130. Therefore, the pouch type secondary battery 110 may be disposed at an accurate position, and the shaking of the pouch type secondary battery 110 may be prevented at the time of the vibration.

The present invention is not limited to the above-mentioned exemplary embodiments, and may be variously applied, and may be variously modified without departing from the gist of the present invention claimed in the claims.

The invention claimed is:

1. A partition for a pouch type secondary battery, which includes a pouch having a receiving part receiving an electrolyte therein and a sealing part formed by sealing an outer circumference of the receiving part in order to seal the receiving part and an electrode tab connected to one side of the pouch so as to be protruded, the partition being provided between two neighboring pouch type secondary batteries, the partition comprising:
   an electrode tab supporting part supporting the electrode tab;
   a frame extended from the electrode tab supporting part, supporting the sealing part, and having the receiving part inserted thereinto; and
   a buffering pad attached to an inner side of the frame at which the receiving part is seated so as to be disposed between the frame and the receiving part,
   wherein the buffering pad has a rectangular cross-sectional shape, a part of one side of which is opened to form a depression part, into which an inner end portion of the frame is inserted.

2. The partition of claim 1, wherein the frame has a thickness thinner at the inner end portion to which the buffering pad is attached than at a portion at which the buffering pad is not attached.

* * * * *